United States Patent
Yu et al.

(10) Patent No.: US 11,268,831 B2
(45) Date of Patent: Mar. 8, 2022

(54) DEVICE AND METHOD FOR DETECTING POSITION IN DRIVING-SENSING INTEGRATED CAMERA MODULE

(71) Applicant: Samsung Electro-Mechanics Co., Ltd., Suwon-si (KR)

(72) Inventors: Je Hyeon Yu, Suwon-si (KR); Jung Eun Youm, Suwon-si (KR); Ji Hwan Kim, Suwon-si (KR); Ja Hwi Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 6 days.

(21) Appl. No.: 16/838,185

(22) Filed: Apr. 2, 2020

(65) Prior Publication Data

US 2021/0199471 A1 Jul. 1, 2021

(30) Foreign Application Priority Data

Dec. 26, 2019 (KR) ........................ 10-2019-0175324

(51) Int. Cl.
 *G01D 5/20* (2006.01)
 *G02B 7/02* (2021.01)
(52) U.S. Cl.
 CPC ................ *G01D 5/20* (2013.01); *G02B 7/02* (2013.01)

(58) Field of Classification Search
 CPC ........................................................ G01D 5/20
 See application file for complete search history.

(56) References Cited

U.S. PATENT DOCUMENTS

| | | | |
|---|---|---|---|
| 2009/0085558 A1* | 4/2009 | David | H02K 11/215 324/207.2 |
| 2013/0242172 A1* | 9/2013 | Hamano | G03B 3/00 348/349 |
| 2018/0067277 A1 | 3/2018 | Bang et al. | |
| 2018/0095341 A1* | 4/2018 | Lee | G02B 27/646 |
| 2019/0154955 A1 | 5/2019 | Pang et al. | |

FOREIGN PATENT DOCUMENTS

| | | |
|---|---|---|
| KR | 10-2018-0028586 A | 3/2018 |
| KR | 10-2018-0037879 A | 4/2018 |
| KR | 10-2029541 B1 | 10/2019 |

\* cited by examiner

*Primary Examiner* — Noam Reisner
(74) *Attorney, Agent, or Firm* — NSIP Law

(57) ABSTRACT

A position detecting device includes a detector circuit detecting a detection signal including information on a position of a magnet from a coil disposed in a housing and opposing the magnet, which is disposed in a lens barrel; and a control circuit converting the detection signal into a count value, determining a conversion formula based on the count value and a velocity of change in the count value, and detecting a position value using the determined conversion formula.

15 Claims, 7 Drawing Sheets

POSITION 1

POSITION 2

POSITION 3

DEVICE AND METHOD FOR DETECTING POSITION IN DRIVING-SENSING INTEGRATED CAMERA MODULE

CROSS-REFERENCE TO RELATED APPLICATION(S)

This application claims the benefit under 35 USC 119(a) of Korean Patent Application No. 10-2019-0175324 filed on Dec. 26, 2019 in the Korean Intellectual Property Office, the entire disclosure of which is incorporated herein by reference for all purposes.

BACKGROUND

1. Field

The following description relates to a device and a method for detecting a position in a driving-sensing integrated camera module.

2. Description of Background

As mobile phones, such as smartphones, have been designed to have various functions, it has been necessary to reduce sizes of various circuits and components embedded in mobile phones.

The reduction of sizes of smartphones may be required for a camera module using a driving-sensing integrated method.

A general camera module using a hall sensing method may include an optical image stabilization (OIS) coil and a hall sensor. In a camera module using such a hall sensor, the hall sensor may be disposed at the strongest position in order to sense a magnetic field.

When a hall sensor is used, however, it may be difficult to reduce a size thereof. Thus, a sensor-less camera module which may drive an actuator and may detect a position using a coil, instead of using a hall sensor, has been developed.

In such a camera module without a sensor, however, an eddy current may be generated by a magnetic field generated between a coil and a magnet, and a position may be detected using an eddy current.

A general position detecting device in a camera module without a sensor may perform a sensing operation based on an overlap between a magnet and a coil to sense a position for an autofocusing (AF) function, and to detect forward and backward movements in an optical direction, two detection coils may be used.

However, when two detection coils and a single driving coil are used, there may still be a limitation in reducing a size. Accordingly, in implementing a structure in which a driving operation and a detection operation can be simultaneously performed using a single coil, there may be an issue in which it may be difficult to accurately distinguish forward movement from backward movement in an optical direction.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A device and a method for detecting a position in a driving-sensing integrated camera module which may accurately detect a position of a lens in a camera module having a driving-sensing integrated coil.

In one general aspect, a position detecting device includes a detector circuit detecting a detection signal including information on a position of a magnet from a coil disposed in a housing and opposing the magnet, which is disposed in a lens barrel; and a control circuit converting the detection signal into a count value, determining a conversion formula based on the count value and a velocity of change in the count value, and detecting a position value using the determined conversion formula.

The control circuit may include a signal converter circuit to convert the detection signal into the count value; a formula determination circuit to determine the conversion formula based on an error between the count value and a target value and based on a velocity of changes in the error; and a position detector circuit to convert the count value into the position value using the conversion formula determined by the formula determination circuit.

In a case in which the count value is included in a predetermined monitoring range such that the error between the count value and the target value increases and the velocity of changes in the error increases, the formula determination circuit may change a first conversion formula to a second conversion formula.

The monitoring range may be based on a central value corresponding to a center between a maximum count value and a minimum count value.

The first conversion formula may be SP=b*D−CNT, where SP is the position value, b is a constant, and D_CNT is the count value.

The second conversion formula may be SP=b*{(2*D_CNT−CT_CNT}, where CT_CNT is the central value.

In another general aspect, a method of detecting a position includes detecting a detection signal including information on a position of a magnet from a single coil disposed in a housing and opposing the magnet, which is disposed in a lens barrel; converting the detection signal into a count value; determining whether a condition for changing a conversion formula is satisfied based on the count value; maintaining a first conversion formula when the condition for changing the conversion formula is not satisfied, and changing the first conversion formula to a second conversion formula in a case in which the condition for changing the conversion formula is satisfied; and selectively detecting a position value using the first conversion formula or the second conversion formula.

Determining whether the condition for changing the conversion formula is satisfied may be based on an error between the count value and a target value and a velocity of change in the error.

Determining whether the condition for changing the conversion formula is satisfied may include: determining whether the count value is included in a monitoring range; calculating an error between the count value and a target value; and determining whether a velocity of change in the error increases while the error between the count value and the target value increases.

The conversion formula may be a basic formula.

The monitoring range may be determined based on a central value corresponding to a center between a maximum count value and a minimum count value.

In another general aspect, a camera module includes a lens barrel including a magnet; a substrate including a coil disposed opposite to the magnet; and one or more circuits to detect a detection signal related to a position of the magnet from the coil, to convert the detection signal into a count value, to determine a conversion formula based on the count value, and to detect a position value using the determined conversion formula.

The one or more circuits may determine whether the conversion formula is a first conversion formula or a second conversion formula based on one or more values associated with an error in the count value; and convert the count value into the position value using the determined first conversion formula or second conversion formula.

The one or more values associated with the error in the count value may include an error between the count value and a target value and a velocity of changes in the error between the count value and the target value.

The first conversion formula may be a default conversion formula, and in a case in which the error between the count value and the target value increases and the velocity of changes in the error increases, the one or more circuits may change the first conversion formula to the second conversion formula.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
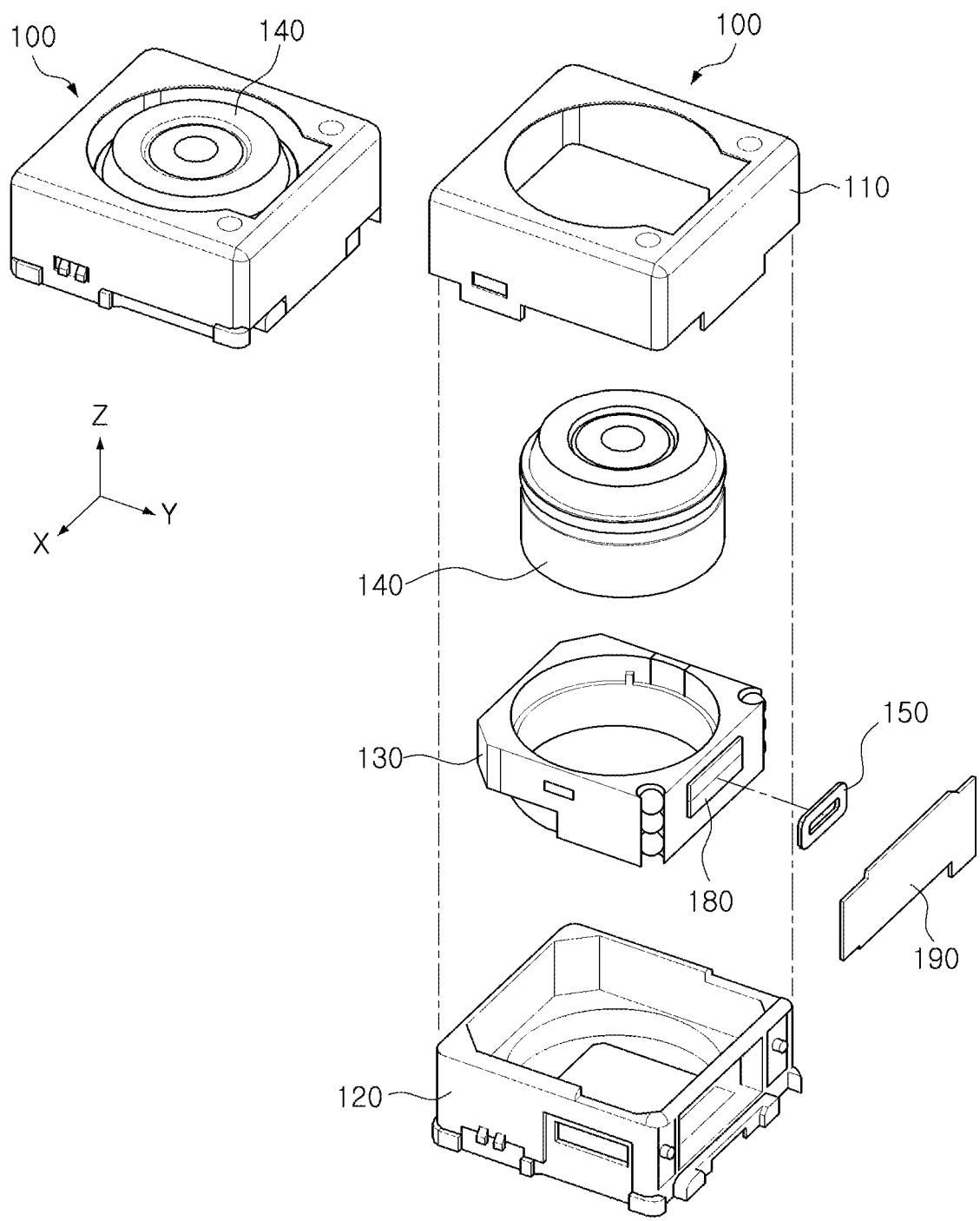
FIG. 1 is a diagram illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating an example of a camera module.

Referring to FIG. 1, a camera module 100 may include a case 110, a housing 120, a lens barrel 130, a magnet 180, and a single coil 150.

The case 110 may be combined with the housing 120. The housing 120 may be combined with the case 110 and may include an accommodation space.

As an example, the case 110 may include a metal material or may be formed of a metal material, and may be grounded to a ground pad of a substrate disposed below the housing 120 (for example, in the −Z direction). Accordingly, the case 110 may shield electromagnetic waves generated while a camera device is driven.

The lens barrel 130 may be disposed in an accommodation space of the housing 120, and a lens module 140 disposed along an optical axis (for example, Z-axis direction) may be disposed in the lens barrel 130.

The magnet 180 may be disposed on an external side of the lens barrel 130. As an example, the magnet 180 may be configured as a member including a magnetic material, or may be configured as a dielectric material or a conductive material.

The single coil 150 may be mounted on a substrate 190 disposed in the housing 120 and opposing the magnet 180. The single coil 150 may be used for both a driving operation and a detecting operation.

As an example, the single coil 150 may be spaced apart from the magnet 180 by a certain gap, and when a driving current flows in the single coil 150, driving force may be transferred to the magnet 180 by electromagnetic force generated by the single coil 150 such that the magnet 180 may move. Accordingly, the lens module 140 disposed in the lens barrel 130 to which the magnet 180 is attached may move in an X axis direction.

In this case, an inductance value of the single coil 150 may change by magnetic force working between the single coil 150 and the magnet 180, and a position of the magnet 180 may be detected, based on the change in inductance.

Figure 2:
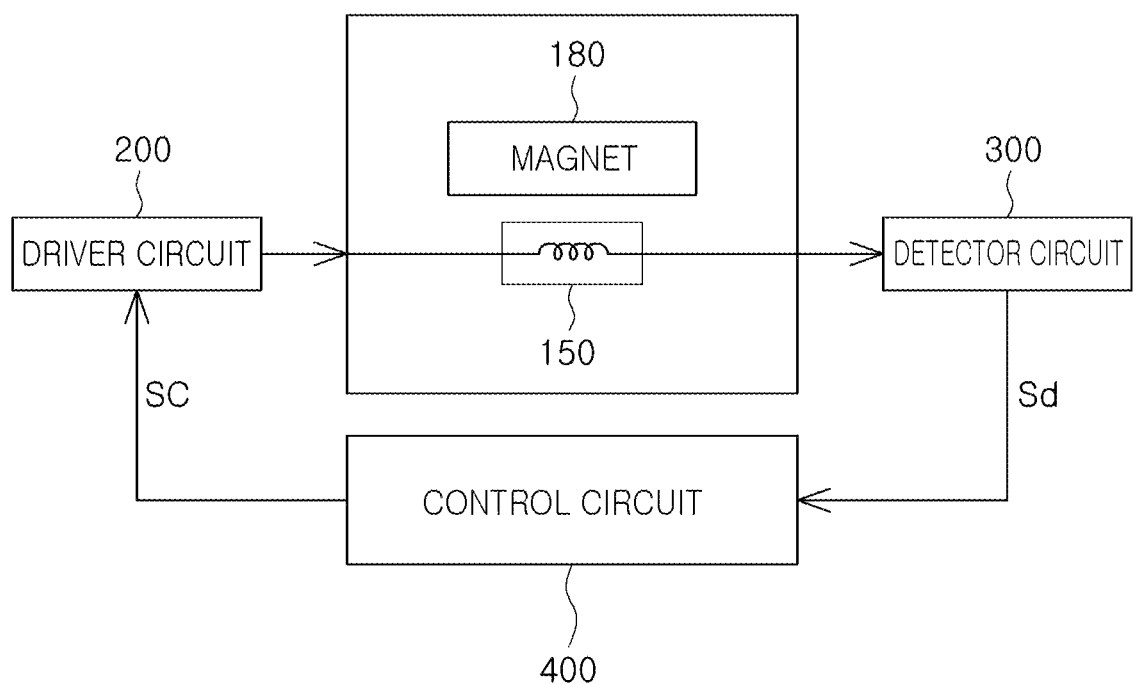
FIG. 2 is a diagram illustrating an example of a position detecting device.

FIG. 2 is a diagram illustrating an example of a position detecting device.

Referring to FIG. 2, a position detecting device may include a detector circuit 300 and a control circuit 400. The position detecting device may further include a driver circuit 200.

The detector circuit 300 may detect a detection signal Sd including information on a position of the magnet 180 from a single coil 150 disposed in a housing 120 and opposing a magnet 180 disposed in a lens barrel 130.

The control circuit 400 may convert the detection signal Sd into a count value D_CNT, may determine a conversion formula based on the count value D_CNT and a velocity of change in the count value D_CNT, and may detect a position value SP using the determined conversion formula.

The driver circuit 200 may drive a camera module 100 in response to a control signal SC received from the control circuit 400.

In the diagrams, unnecessarily overlapping descriptions in relation to the same reference numeral and the same function will not be provided, and differences among the examples in the diagrams will mainly be described.

Figure 3:
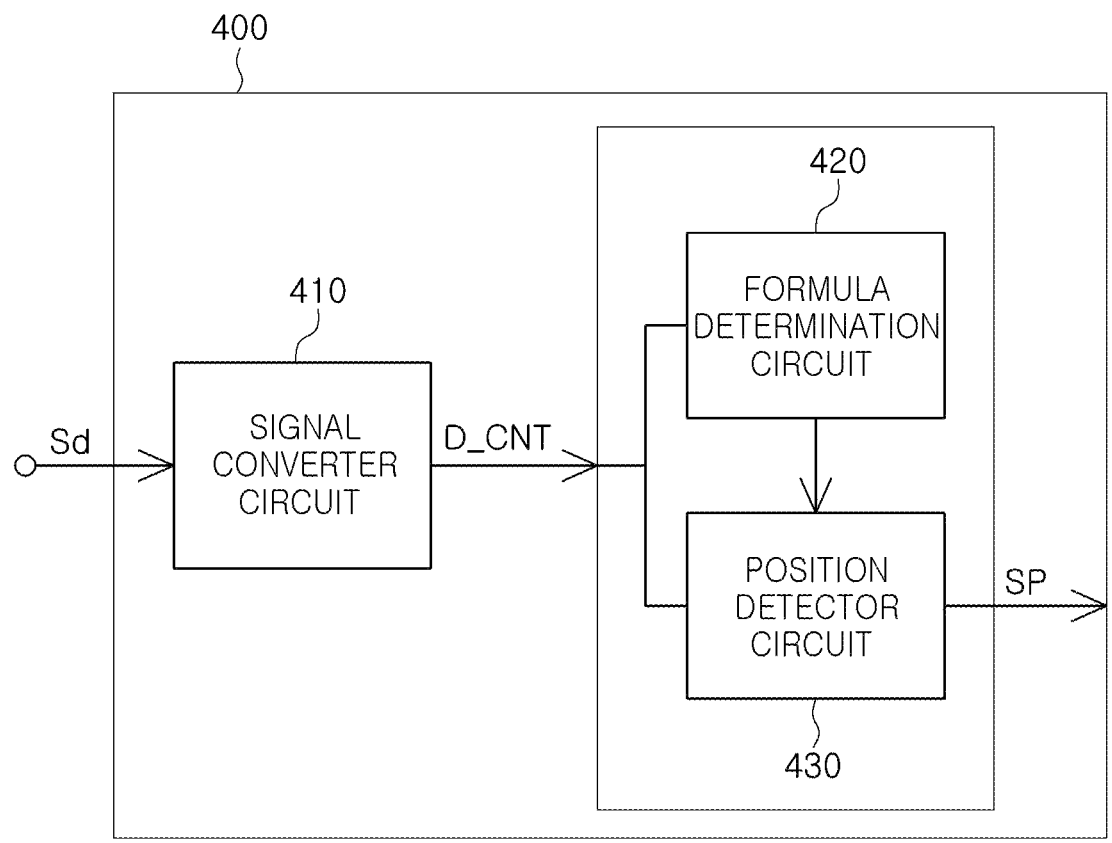
FIG. 3 is a diagram illustrating an example of a control circuit illustrated in FIG. 2.

FIG. 3 is a diagram illustrating an example of a control circuit illustrated in FIG. 2.

Referring to FIG. 3, a control circuit 400 may include a signal converter circuit 410, a formula determination circuit 420, and a position detector circuit 430.

The signal converter circuit 410 may convert a detection signal Sd into a count value D_CNT. As an example, the signal converter circuit 410 may count the detection signal Sd using a reference clock signal and may generate the count value D_CNT.

The formula determination circuit 420 may determine the conversion formula based on an error between the count value D_CNT and a target value T-CNT and a velocity of change in the error.

The position detector circuit 430 may convert the count value D_CNT into a position value SP using the conversion formula determined by the formula determination circuit 420.

For example, when the count value D_CNT is included in a predetermined monitoring range CT_CNT □ a (a is a constant) such that an error between the count value and the target value increases and a velocity of changes in the error increases, the formula determination circuit 420 may change a first conversion formula, determined as a basic formula, to a second conversion formula.

The monitoring range CT_CNT □ a may be predetermined based on a central value CT_CNT corresponding to a center between a maximum count value and a minimum count value.

As an example, the first conversion formula may be represented by Equation 1 below.

$$SP=b*\text{count value } D\text{-CNT} \quad \text{[Equation 1]}$$

In Equation 1, "SP" is a position value, "b" is a constant, and "D_CNT" is a count value.

As an example, the second conversion formula may be represented by Equation 2 below.

$$SP=b*\{(2*\text{count value } D\_CNT\text{-central value } CT\_CNT\} \quad \text{[Equation 2]}$$

In Equation 2, "SP" is a position value, "b" is a constant, "D_CNT" is a count value, and "CT_CNT" is the central value. For example, b may be "1," but an example is not limited thereto.

Figure 4:
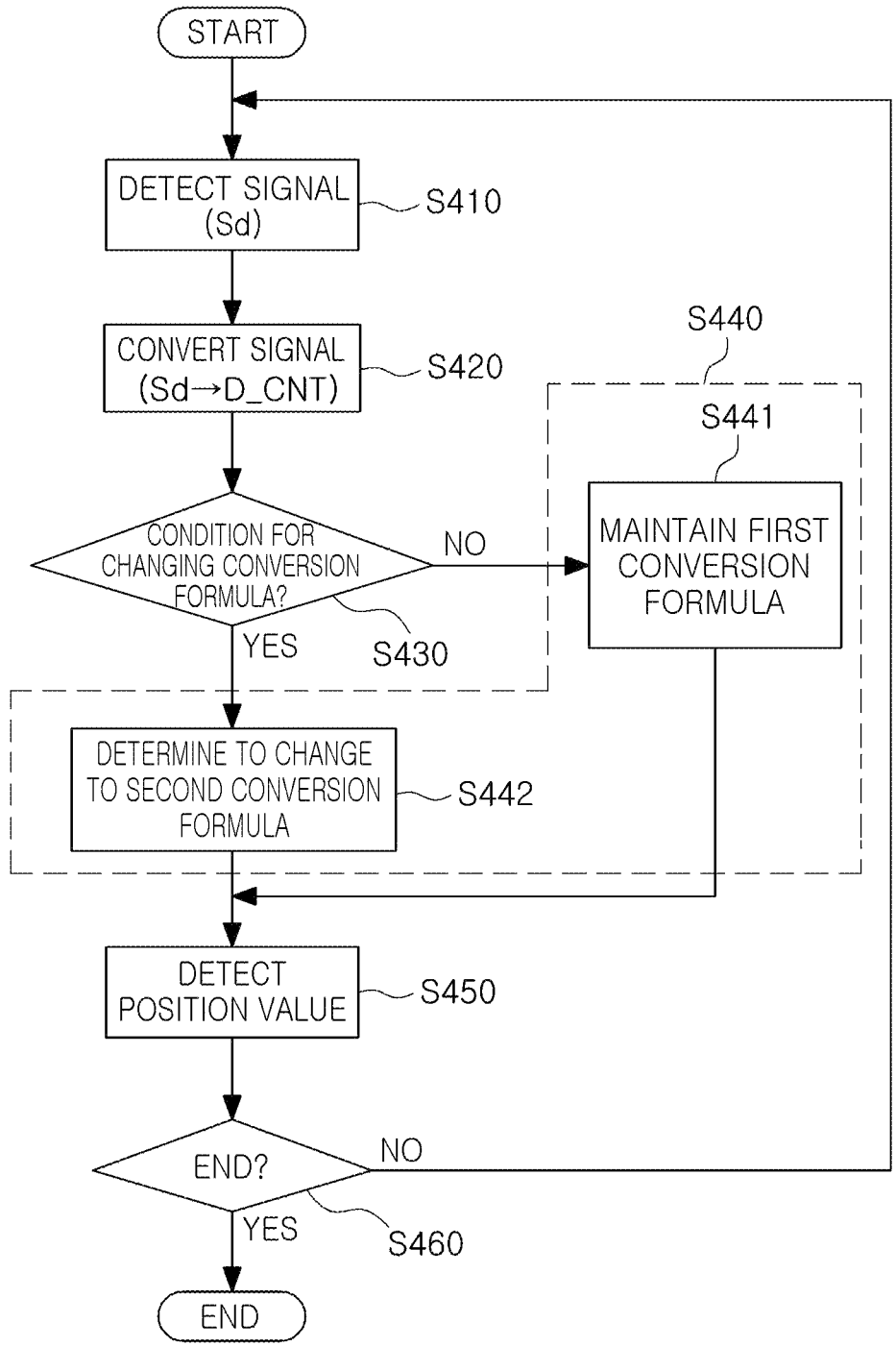
FIG. 4 is a diagram illustrating an example of a method of detecting a position.

FIG. 4 is a diagram illustrating an example of a method of detecting a position.

In the description below, a method of detecting a position will be described in accordance with an example.

In the description of the method of detecting a position of a camera module, the same descriptions of the operations described with reference to FIGS. 1 to 3 may be applied, and accordingly, overlapping descriptions will not be provided in the description of the position detecting device.

Referring to FIG. 4, in an operation of detecting a signal (S410), a detection signal Sd including information on a position of a magnet 180 may be detected from a single coil 150 disposed in a housing and opposing the magnet 180 disposed in a lens barrel 130. As an example, the detecting a signal (S410) may be performed by a signal detector circuit 300.

In an operation of converting a signal (S420), the detection signal Sd may be converted into a count value D_CNT. As an example, the converting a signal (S420) may be performed by a signal converter circuit 410 of a control circuit 400.

In an operation of determining a condition for changing a conversion formula (S430), it may be determined whether a condition for changing a conversion formula is satisfied based on the count value D–CNT. As an example, the determining a condition for changing a conversion formula (S430) may be performed by a formula determination circuit 420 of the control circuit 400. As an example, in the determining a condition for changing a conversion formula (S430), it may be determined whether the condition for changing a conversion formula is satisfied based on an error between the count value D–CNT and the target value T-CNT and a velocity of change in the error.

In an operation of determining a conversion formula (S440), when the condition for changing a conversion formula is not satisfied, a first conversion formula may be maintained (operation S441), and when the condition for changing a conversion formula is satisfied, the first conversion formula may be changed to a second conversion formula (operation S442). As an example, the determining a conversion formula (S440) may be performed by the formula determination circuit 420 of the control circuit 400.

In an operation of detecting a position value SP (S450), the position value SP may be detected using the first conversion formula or the second conversion formula. As an example, the detecting a position value SP may be performed by a position detector circuit 430 of the control circuit 400.

In operation S460, it is determined whether or not the detecting of the position is completed. If it is determined that the detecting of the position is completed, the process is completed. If it is determined that the detecting of the position is not completed, the process is returned to operation S410.

Figure 5:
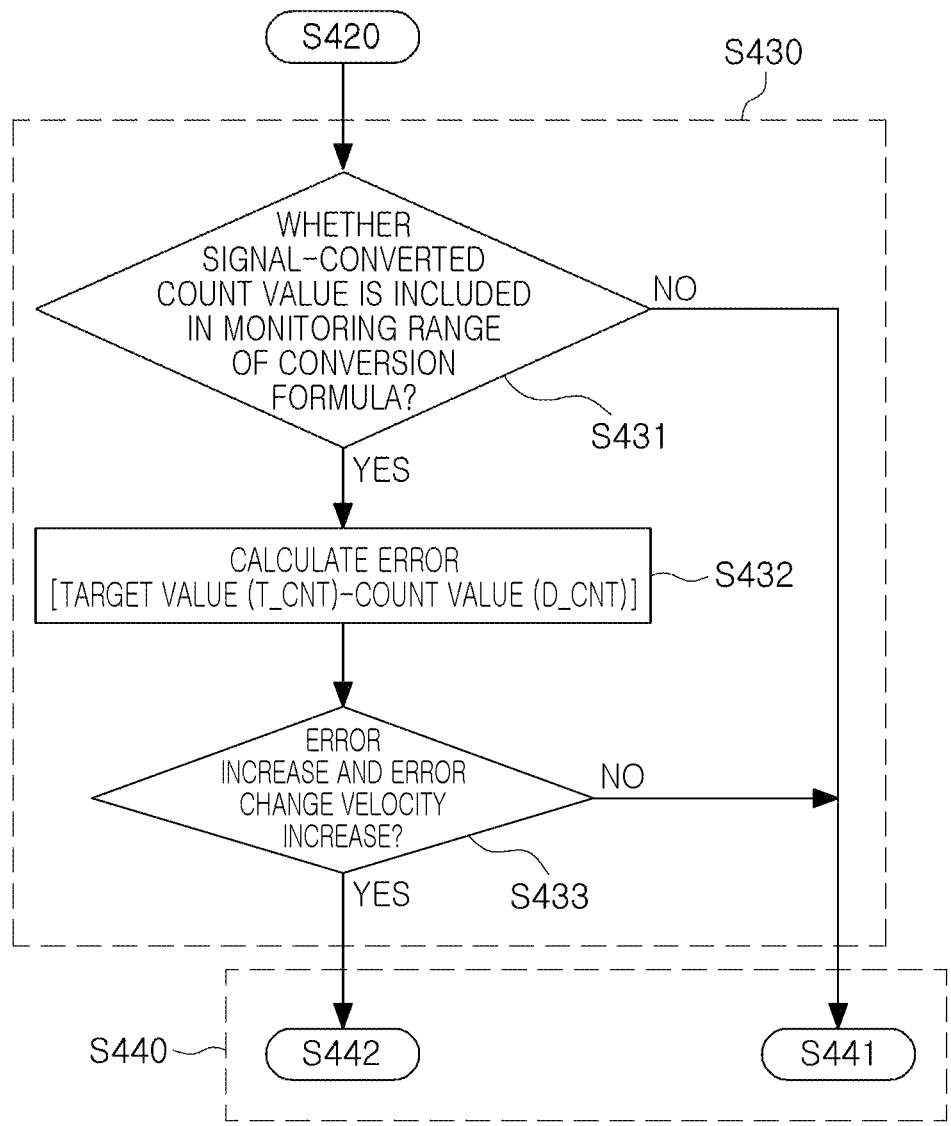
FIG. 5 is a diagram illustrating an example of a process of determining conditions for changing a conversion formula illustrated in FIG. 4.

FIG. 5 is a diagram illustrating an example of a process of determining conditions for changing a conversion formula illustrated in FIG. 4.

Referring to FIG. 5, in the determining a condition for changing a conversion formula (S430), it may be determined whether the count value D_CNT is included in a predetermined monitoring value CT_CNT±□ a (a is a constant) (S431). An error between the count value D–CNT and the target value T-CNT may be calculated (S432). It may be determined whether a velocity of change in the error increases while the error between the count value D–CNT and the target value T-CNT increases (S433).

As an example, in the determining a conversion formula (S440), when the condition for changing a conversion formula is satisfied, the first conversion formula, determined as a basic formula, may be changed to a second conversion formula.

As an example, the monitoring value CT_CNT □ a may be predetermined based on a central value CT_CNT corresponding to a center between a maximum count value and a minimum count value.

The first conversion formula may be Equation 1 as described above, and the second conversion formula may be Equation 2 as described above.

Figure 6:
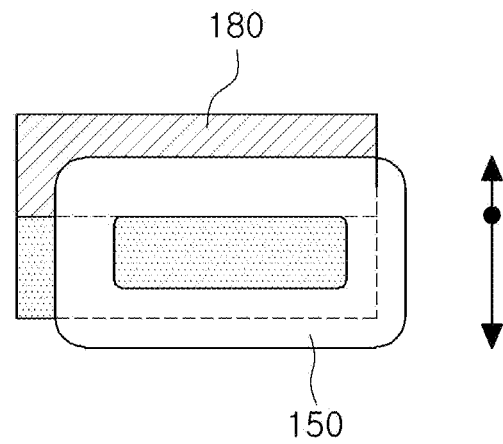
FIG. 6 is a diagram illustrating an example of position 1 between a magnet and a single coil.
Figure 7:
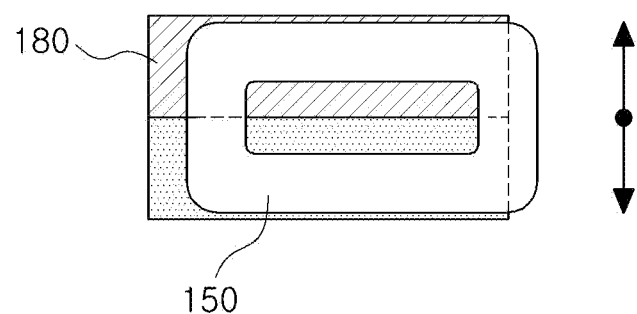
FIG. 7 is a diagram illustrating an example of position 2 between a magnet and a single coil.
Figure 8:
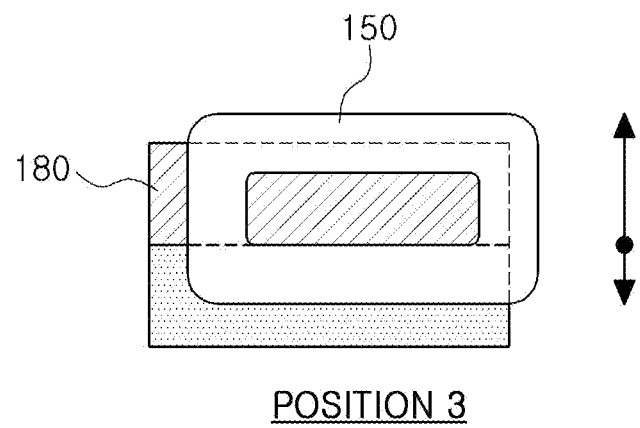
FIG. 8 is a diagram illustrating an example of position 3 between a magnet and a single coil.
Figure 9:
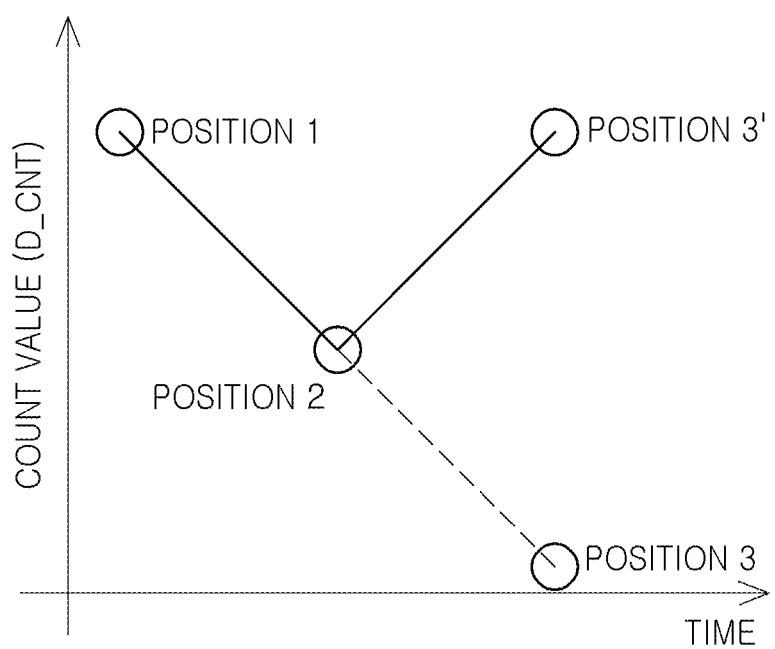
FIG. 9 is a diagram illustrating an example of a moving position and a detected position of a magnet when a conversion formula is not changed.

FIG. 6 is a diagram illustrating an example of position 1 between a magnet and a single coil. FIG. 7 is a diagram illustrating an example of position 2 between a magnet and a single coil. FIG. 8 is a diagram illustrating an example of position 3 between a magnet and a single coil. FIG. 9 is a diagram illustrating an example of a moving position and a detected position of a magnet when a conversion formula is not changed.

Referring to FIGS. 6 to 9, when a magnet 180 moves over position 1 and position 2 and to position 3, an area of overlap between the magnet 180 and a single coil 150 may be the same in position 1 in FIG. 6 and in position 3 in FIG. 8. Accordingly, a detected count value D_CNT may be the same such that it may be difficult to accurately detect a position.

Figure 10:
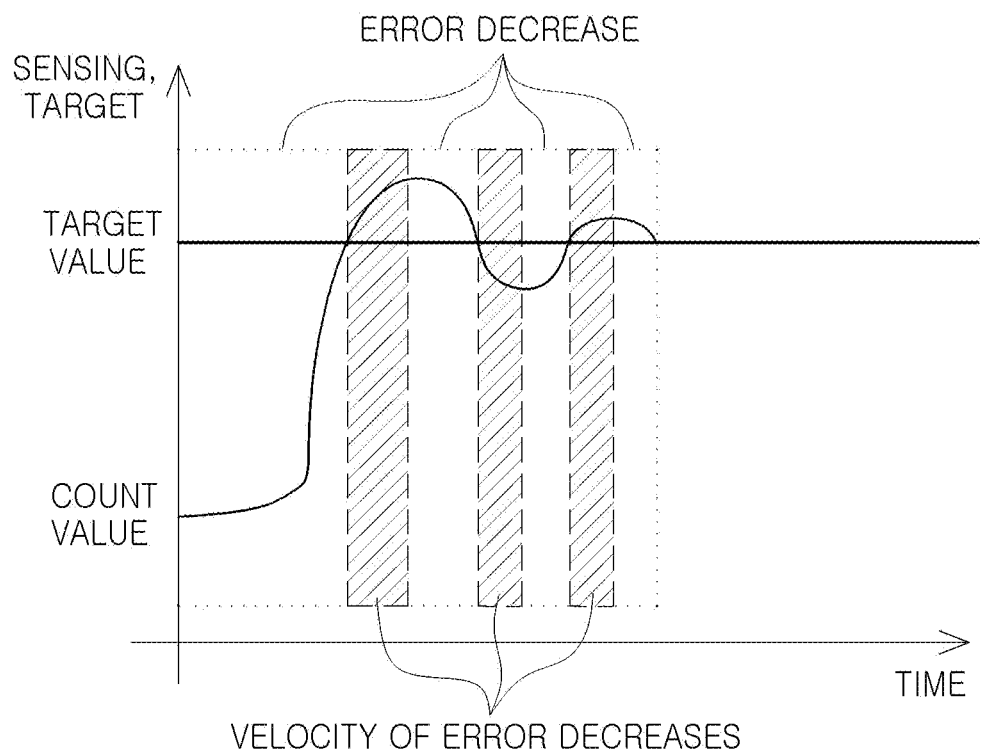
FIG. 10 is a diagram illustrating an error between a count value D–CNT and a target value T–CNT and a velocity of a change in error.
Figure 11:
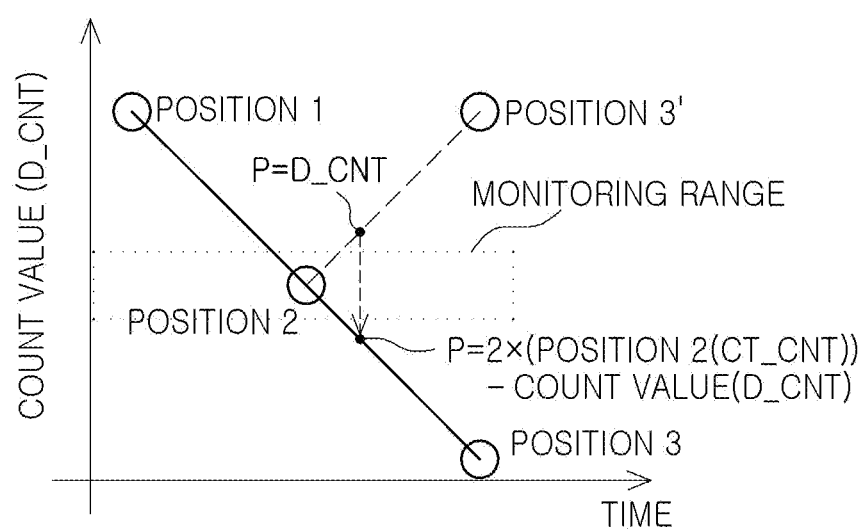
FIG. 11 is a diagram illustrating an example of a moving position and a detected position of a magnet when a conversion formula is changed.

FIG. 10 is a diagram illustrating an error between a count value D–CNT and a target value T-CNT and a velocity of change in error. FIG. 11 is a diagram illustrating an example of a moving position and a detected position of a magnet when a conversion formula is changed.

Referring to FIG. 10, while a count value D_CNT corresponding to a detected current position becomes close to a target value T-CNT (a target position), an error may decrease and an error velocity may also decrease.

When the magnet 180 is approximate to position 2 in FIG. 7 and cannot detect position 3 but detects a position as position 3' with reference to single coil 150, the detected position may be distanced from an actual target value (a target position), differently from FIG. 10. In this case, the error may increase and the error velocity may also increase.

Thus, as described above, when the detected position is included in a monitoring range such that an error between the detected count value D_CNT and the target value T-CNT increases and an error velocity also increases, the initially determined first conversion formula may be changed to a second conversion formula.

When the conversion formula is changed to the second conversion formula, and a position is controlled to move over "position 1 to position 2 to position 3," by applying the second conversion formula, position 3' may be accurately detected as position 3 when the error increases and the error velocity increases in the monitoring range based on position 2 as described above.

The control circuit of the position detecting device in the examples may be implemented in a computing environment in which a processor (e.g., a central processing unit (CPU), a graphics processor (GPU), a microprocessor, an application specific integrated circuit (ASIC), a field programmable gate array (FPGA)), a memory (a volatile memory (e.g., a RAM), a non-volatile memory (e.g., a ROM and a flash memory), an input device (e.g., a keyboard, a mouse, a pen, a voice input device, a touch input device, an infrared camera, a video input device, or the like), an output device (e.g., a display, a speaker, a printer, or the like), and a communications connection device (e.g., a modem, a network interface card (NIC), an integrated network interface, a wireless frequency transmitter/receiver, an infrared port, a USB connection device, or the like) are interconnected (e.g., peripheral component interconnect (PCI), USB, firmware (IEEE 1394), an optical bus structure, a network, or the like).

The computing environment may be implemented as a personal computer, a server computer, a handheld or laptop device, a mobile device (a mobile phone, a PDA, a media player, or the like), a multiprocessor system, a consumer electronic device, a mini-computer, a mainframe computer, and a distributed computing environment including an above-described random system or device, but embodiment configuration thereof is not limited thereto.

According to the aforementioned examples, in a camera module having a driving-sensing integrated coil, a position of a lens may be accurately detected, and using the driving-sensing integrated single coil, an area of overlap between a magnet and a coil and directions of the magnet and the coil may be sensed such that a size of a camera module may be reduced, and manufacturing costs may decrease by structural simplification.

Accordingly, a stable timing margin may be obtained, and manufacturing performance and stability may increase.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A position detecting device, comprising:
    a detector circuit configured to detect a detection signal including information on a position of a magnet disposed in a lens barrel, wherein the information on the position of the magnet is based on an inductance value of a coil disposed in a housing and opposing the magnet; and
    a control circuit configured to convert the detection signal into a count value, to determine a conversion formula based on an error between the count value and a target value, and a velocity of changes in the error, and to detect a position value using the determined conversion formula.

2. The position detecting device of claim 1, wherein the control circuit comprises:
    a signal converter circuit configured to convert the detection signal into the count value;
    a formula determination circuit configured to determine the conversion formula based on the error between the count value and the target value, and the velocity of changes in the error; and
    a position detector circuit configured to convert the count value into the position value using the conversion formula determined by the formula determination circuit.

3. The position detecting device of claim 2, wherein, in a case in which the count value is included in a predetermined monitoring range such that the error between the count value and the target value increases and the velocity of changes in the error increases, the formula determination circuit changes a first conversion formula to a second conversion formula.

4. The position detecting device of claim 3, wherein the monitoring range is based on a central value corresponding to a center between a maximum count value and a minimum count value.

5. The position detecting device of claim 4, wherein the first conversion formula is:

$$SP=b*D\_CNT,$$

where SP is the position value, b is a constant, and D_CNT is the count value.

6. The position detecting device of claim 5, wherein the second conversion formula is:

$$SP=b*\{(2*D\_CNT-CT\_CNT\},$$

where CT_CNT is the central value.

7. A method of detecting a position, the method comprising:
    detecting a detection signal including information on a position of a magnet disposed in a lens barrel, wherein the information on the position of the magnet is based on an inductance value of a coil disposed in a housing and opposing the magnet;
    converting the detection signal into a count value;
    determining whether a condition for changing a conversion formula is satisfied based on the count value;
    maintaining a first conversion formula in a case in which the condition for changing the conversion formula is not satisfied, and changing the first conversion formula to a second conversion formula when the condition for changing the conversion formula is satisfied; and
    selectively detecting a position value using the first conversion formula or the second conversion formula,
    wherein the determining whether the condition for changing the conversion formula is satisfied is based on an error between the count value and a target value, and a velocity of change in the error.

8. The method of claim 7, wherein the determining whether the condition for changing the conversion formula is satisfied includes:
    determining whether the count value is included in a monitoring range;
    calculating the error between the count value and the target value; and
    determining whether the velocity of change in the error increases while the error between the count value and the target value increases.

9. The method of claim 8, wherein the conversion formula is a basic formula.

10. The method of claim 9, wherein the monitoring range is determined based on a central value corresponding to a center between a maximum count value and a minimum count value.

11. The method of claim 10, wherein the first conversion formula is:

$$SP=b*D\_CNT,$$

where SP is the position value, b is a constant, and D_CNT is the count value.

12. The method of claim 11, wherein the second conversion formula is:

$$SP=b*\{(2*D\_CNT-CT\_CNT\},$$

where CT_CNT is the central value.

13. A camera module, comprising:
    a lens barrel comprising a magnet;
    a substrate comprising a coil disposed opposite to the magnet; and
    one or more circuits configured to detect a detection signal related to a position of the magnet and based on an inductance value of the coil, to convert the detection signal into a count value, to determine a conversion formula based on an error between the count value and a target value, and a velocity of changes in the error, and to detect a position value using the determined conversion formula.

14. The camera module of claim 13, wherein the one or more circuits are further configured to:

determine whether the conversion formula is a first conversion formula or a second conversion formula based on the error between the count value and the target value, and the velocity of changes in the error; and convert the count value into the position value using the determined first conversion formula or second conversion formula.

15. The camera module of claim 14, wherein the first conversion formula is a default conversion formula, and wherein the one or more circuits are further configured to change the first conversion formula to the second conversion formula, in response to the error between the count value and the target value increasing and the velocity of changes in the error increasing.

\* \* \* \* \*